US005747561A

United States Patent [19]

Smirnov et al.

[11] Patent Number: 5,747,561
[45] Date of Patent: May 5, 1998

[54] SOLID SURFACE MODIFIER

[76] Inventors: Aleksandr Vitalievich Smirnov, #9 Rossoshanskay Street, 3 Apt. 5, Moscow, Russian Federation, 118535; Oleg Georgievich Orlov, #74, Apt. 47 Prospect Mira, Moscow, Russian Federation, 128722; Pyotr Nikolaevich Golipad, #10, Apt. 24 Vtoraya Baumanskaya Str., Moscow, Russian Federation, 107005; Yurii Nikolaevich Koriakin, #16 Rublevesk Shosse, Apt. 23, Moscow, Russian Federation, 121467; Boris Mikhailovich Yegorov, #16 Rublevesk Shosse, Apt. 1, Moscow, Russian Federation, 121467

[21] Appl. No.: 416,745

[22] PCT Filed: Oct. 4, 1993

[86] PCT No.: PCT/US93/09482

§ 371 Date: Oct. 23, 1995

§ 102(e) Date: Oct. 23, 1995

[87] PCT Pub. No.: WO94/09074

PCT Pub. Date: Apr. 28, 1994

[30] Foreign Application Priority Data

Oct. 14, 1992 [RU] Russian Federation ............ 92-000551

[51] Int. Cl.$^6$ ................. C08K 9/06; C08K 5/22; B05D 3/02
[52] U.S. Cl. ................. 523/212; 106/14.37; 106/14.39; 106/14.44; 106/271; 106/287.11; 106/287.13; 106/287.14; 106/287.26; 523/212; 427/387; 427/386; 524/727; 524/506
[58] Field of Search ............. 106/14.37, 14.39, 106/14.44, 271, 287.11, 287.13, 287.14, 287.26; 524/506, 727; 523/212; 427/387, 386

[56] References Cited

U.S. PATENT DOCUMENTS

| | | | |
|---|---|---|---|
| 3,024,146 | 3/1962 | Bueche et al. | 523/212 |
| 3,177,170 | 4/1965 | Lund | 523/212 |
| 3,341,490 | 9/1967 | Burdick et al. | 523/212 |
| 3,649,588 | 3/1972 | Kennedy-Skipton | 523/212 |
| 3,905,823 | 9/1975 | Piskoti | 106/38.22 |
| 4,175,159 | 11/1979 | Raleigh | 428/405 |
| 4,177,315 | 12/1979 | Ubersax | 428/336 |
| 4,229,228 | 10/1980 | Rotenberg et al. | 106/287.14 |
| 4,368,235 | 1/1983 | Vaughn | 428/412 |
| 5,013,788 | 5/1991 | Nagahima et al. | 524/727 |
| 5,045,574 | 9/1991 | Kuwata et al. | 523/212 |

*Primary Examiner*—Karen A. Dean
*Attorney, Agent, or Firm*—Oppenheimer Wolff & Donnelly, LLP

[57] ABSTRACT

A chemically stable solid surface coating modifier is provided by application to a substrate of a dispersion containing a highly dispersed hydrophobic powder, a silicon liquid, a solvent, and, optionally, an adhesive. The powder has been activated by alkali or alkaline salts and then treated with an organic silylating agent. The modifer is effective in imparting water repellent, anti-fouling, anti-icing, anti-corrosive, anti-friction properties to varies surfaces. The modifer also provides protection against other chemical, biological and atmospheric agents.

17 Claims, No Drawings

SOLID SURFACE MODIFIER

BACKGROUND OF THE INVENTION

1. Field of the Invention

This invention relates to materials technology and more particularly to protective coatings. In one of its more particular aspects the present invention is directed to multipurpose coatings having properties which make them useful for waterproofing various types of surfaces and rendering them resistant to icing, encrustation and fouling. In another of its more particular aspects this invention relates to protecting surfaces from corrosion and attack by acids, alkalies, and other strong electrolytes, and by microorganisms.

2. Description of Related Art

Various surfaces have been protected against corrosion, icing and fouling by means of coatings containing polymer films, hydrophobic solid fillers and hydrophobic liquids. A disadvantage of the use of such coatings is that it has not been possible to achieve multipurpose protection. Such coatings usually are not versatile enough to protect against damage from a variety of causes.

There is a filler or bulk modifier for epoxy compounds which includes powdered quartz and silica filler, a modifier mixture of aminopropyltriethoxysilane and octamethylcyclotetrasiloxane in a (3–6):1 ratio with the silica filler and modification mixture in a (3.5–4):1 ratio (Inventor's Certificate of the USSR 1669165, SO8K 3/36, 1988). The concentration of the pulverized quartz mixture and the modified silica filler is 35–65 percent by weight.

The filler is designed for addition to epoxy resins in amounts of 18–20 percent. The filler enhances the resistance of products and polymer composite coatings to moisture and other weather conditions, tropical climates, and cyclic temperature variations by a factor of 1.5–2.

The filler is prepared as follows.

The silica filler is loaded into a reaction vessel and heated to 200° C. to remove adsorbed water. The modifier vapor is then added from below (the aminopropyltriethoxysilane and octamethylcyclotetrasiloxane in a ratio of (3–6):1.

The reaction can also be conducted in an inert gas flow or in a vacuum. The reaction byproducts and the physically adsorbed siloxane molecules are removed from the silica filler surface by means of vacuuming or by inert gas at the reaction temperature for a period of 1–2 hours. Silica filler containing an amino group modified silica surface at 0.42–0.8 mmol/g is used.

A drawback of this modifier is poor protective action upon application to surfaces.

A hydrophobic modifier-thickener of highly dispersed media which takes the form of a methoxylated Aerosil (Inventor's Certificate of the USSR 1319476, SO1V 33/18, 1985) is known. Aerosil methoxylation is initiated by surface activation through mixing with calcinated soda at 8 parts by mass per 100 parts by mass Aerosil and then treating with dimethyldichlorosilane (10 parts by mass).

The closest modifier from the technical viewpoint is a ceramic surface modifier which utilizes polyester as an adhesive, styrol as a solvent, and Aerosil as a highly dispersed powder (Inventor's Certificate of the USSR 1692126, SO4V 41/32, 1990). The Aerosil concentration is 1–3 percent by mass. The modifier forms a film of 0.1–0.3 mm on the product surface which provides moisture protection to the ceramic. The water resistance of the coating is effective for 10–12 days.

A drawback of this modifier is its poor degree of water resistance, its flammability, high drag, and the absence of comprehensive protective capacities.

It is accordingly an object of the present invention to provide multipurpose coatings capable of protecting various types of surfaces from environmental factors.

Another object is to expand the field of application and the protective functions of the coatings.

Another object of this invention is to increase the resistance of coated surfaces to corrosion and attack by chemical and biological agents as well as their resistance to weather conditions. Another object of the present invention is to enhance the protective capacity of a modifier surface by combining water repellant, anti-fouling, anti-icing, anti-corrosive, and anti-friction properties in a chemically stable composition.

SUMMARY OF THE INVENTION

A chemically stable solid surface modifying coating is provided by application to a substrate of a dispersion containing a highly dispersed hydrophobic powder, a silicon liquid, and a solvent. The solid surface modifier coating of the present invention provides protection against water damage, corrosion, icing, and other chemical, biological and atmospheric agents. In addition, the coating possesses anti-fouling and anti-friction properties.

DESCRIPTION OF THE PREFERRED EMBODIMENTS

The solid surface modifier of the present invention is formulated without using a polymeric film which is generally present in protective coatings. Instead, the highly dispersed hydrophobic powder which is deposited on the surface to be protected is retained by adhesion.

Adhesion has been found to be stronger where the concentration of micropores on the surface of the substrate to be modified is higher. Materials such as paper, rubberoid, paperboard, concrete, slate, brick, gypsum, and unpolished wood, as well as textiles and fur provide surfaces to which the adhesion of the solid surface modifier comprising the highly dispersed hydrophobic powder is excellent. Smooth surfaces, such as polished or lacquered wood or metal surfaces, on the other hand, are better coated by means of a preliminary treatment such as primary or undercoating prior to application of the solid surface modifier.

If desired an adhesive can be used to promote adhesion of the solid surface modifier to the substrate.

In general, the solid surface modifier contains the following ingredients in percent by weight:

| | |
|---|---|
| highly-dispersed hydrophobic powder | 2–40 |
| silicon liquid | 0.1–10 |
| adhesive | 0.1–10 |
| solvent | remainder |

The highly dispersed hydrophobic powder can be prepared from a number of finely divided inorganic materials which are rendered hydrophobic by various chemical treatments. Suitable finely divided systems include silicas, such as Aerosil, perlite, talcum, hydrolyzed graphite, metal oxides such as titanium dioxide and zinc oxide and mica-muscovite. The highly dispersed hydrophobic powder is produced by a surface modification process which is achieved through preliminary activation with an alkali or an alkaline salt in an amount equal to about 15–25 wt. % of the material to be modified. Subsequent to such modification the material is treated with a silylating agent such as dimethyl dichlorosilane in an amount equal to about 14–40% by weight of the modified material. For example, a finely divided system such as perlite is immersed in a flask containing soda and stirred for ten minutes. The mixture is then poured into dimethyldichlorosilane (DMDS) and stirred for another fifteen to twenty minutes, with the maximum overall duration of the modification process being about fifty minutes. Hydrophobic silicas and other finely divided systems are thereby obtained. Particle dimensions range from 40 Å to 10 μm. Typical reaction conditions are shown in Table 1.

TABLE 1

| No. | Finely-divided system | Particle size, μm | Bulk density, kg/m₃ | Composition of reactant mixture | Process temperature, degrees C |
|---|---|---|---|---|---|
| 1 | Aerosil A175 | 5–20 | 50 | $SiO_2$, $Na_2CO_3$(KOH), DMDS | 50 |
| 2 | Perlite, filtered | 25 | 120 | Perlite, $Na_2CO_3$(KOH), DMDS | 65 |
| 3 | Graphite, hydroxylized, dried | 50–500 | 12 | Graphite, $Na_2CO_3$(KOH), DMDS | 30 |
| 4 | Titanium dioxide | 0.3 | 2000 | $TiO_2$ $Na_2CO_3$(KOH), DMDS | 35 |
| 5 | Zinc oxide | 0.1–1.0 | 2750–3300 | ZnO, $Na_2CO_3$(KOH), DMDS | 35 |
| 6 | Mica-muscovite (wet grinding) | 5–20 | | $KAl_2[AlSi_3O_{10}]$ $(OH)_2$, $Na_2CO_3$(KOH), DMDS | 50 |

The silicon liquid which is used in the present invention functions as a synergetic agent to enhance the hydrophobic properties of the highly dispersed hydrophobic powder. Although the highly dispersed hydrophobic powder by itself is known to have water repulsion properties, yet the highly dispersed hydrophobic powder itself is insufficient to provide the desired degree of protection due to a steric factor. Since the solid particles of the highly dispersed hydrophobic powder have a spatial geometry such that they cannot maintain uniform and continuous properties across the entire surface to be protected, it is necessary to provide a synergetic additive fluid which can fill the gaps that cannot be filled by the highly dispersed hydrophobic powder due to such steric factor. The synergetic additive of the present invention, that is the silicone liquid, itself has hydrophobic properties. However, it is the combination of the highly dispersed hydrophobic powder and the silicone liquid which together manifest the properties desired to protect the surface from water and moisture and corrosive and other degrading materials.

The silicon liquid used in the process of the present invention is an organosilicon liquid such as a silane, siloxane, silazane or silanolate. Representative silanes include dimethyldichlorosilane and methyltrichlorosilane, as well as alkylalkoxysilanes, $R_xSi(OR)_{4-x}$ and organoaminosilanes $R_xSi(NR_2)_{4-x}$. Typical siloxanes include polymethylsiloxanes and polyethylsiloxanes as well as polyalkylhydrosiloxanes $[(Si(R)_2(H)O]_n$. Representative silazanes are polyorganosilazanes of the formula $[R_2SiNH]_n$. Typical silanolates are organosilanolates of alkali metals, for example, those having the formula $R_2Si(OH)_2ONa$ in mass fractions of 0.2 to 5.0. In general, any organosilicon liquid which provides the function of cooperating with the highly dispersed hydrophobic powder to form a hydrophobic layer can be used.

Adhesives, which are optional, can be selected from any polymer and oliguria which will help retain the highly dispersed hydrophobic powder upon the surface of the substrate to be treated. Vaseline or paraffin, for example, can be used for this purpose. Other materials include epoxy resins, acrylic resins, polyamides and silicones. For example, the adhesive can be an epoxy, acrylic or silicone lacquer. Epoxy lacquers are based on low and medium molecular weight epoxy resins and are linear polyesters with epoxy groups at both ends of the molecular chain and secondary hydroxyl groups distributed along the entire chain. Epoxy lacquers contain curing agents in addition to resins. For example, one suitable lacquer contains a curing agent which consists of a 30% solution of polyamide in ethyl alcohol. Another suitable curing agent is a 50% solution of hexamethylenediamine in ethyl alcohol. Any epoxy lacquer used as an industrial coating to protect structural materials fabricated of steel, aluminum or titanium alloys from corrosion and atmospheric effects can be used as the adhesive for purposes of the present invention. Suitable acrylic lacquers are, for example, those based on copolymers of butylmethacrylate and methacrylic acid. Silicone resins such as organosilicon enamels and polyorganosiloxanes can also. One example of a suitable organosilicon enamel consists of methyphenylsiloxane lacquer with a polyorganosilazane hardening agent. In use, the hardening agent is added to the enamel immediately before use. Any organosilicon enamel which is used as a protective coating for articles fabricated of steel, brass, aluminum alloys or titanium alloys which are subject to atmospheric effects can be used in this invention.

Solvents used are volatile, inert organic solvents such as acetone, hexane, dichloroethane, ethanol, gasoline or ether. For some applications it is desirable to include an acidic or basic adjuvant with the solvent, for example, about 0.1–2 percent by weight sodium bicarbonate, aluminum acetate or acetic acid.

The coating can be applied by traditional methods including the use of a brush, roller, paint sprayer or by immersion. The thickness of the coating will be determined by the dispersion and may be about 0.1 to 0.3 millimeters thick. The dispersion is prepared by admixture of the highly dispersed hydrophobic powder, the silicone liquid and the solvent, with or without adhesive. The dispersion does not form a solid continuous layer but is rather a collection of solid particles that mechanically adhere to the surface to be coated. The thickness will depend to some extent upon the diameter of the powder particles or the size of the agglomerates of these particles which is between about 40 Å and 10 μm. The large particles will be individually distributed while the smaller particles will appear as agglomerates. The adhesive if present will not form a continuous film because it is present in relatively small amounts and because it may not dissolve in the solvent.

The solid surface modifier coating of the present invention can be used in a number of different applications. Some of these applications are to inhibit corrosion processes; inhibit formation of crystallization centers in water pipelines, closed heat exchangers, tubular boilers, chillers, and refrigerators which utilize water, brine solutions, inorganic acids, alkalies, other electrolytes, and other corrosive fluids as coolants; to prevent icing on surfaces; to produce anti-griping hydrophobic coatings for aboveground fixed facilities such as buildings and other structures; to provide anti-icing and anti-corrosion coatings for aircraft; to provide anti-icing, anti-fouling and anti-corrosion coatings for maritime and inland waterway vessels; to improve the resistance of metallic roofs to pathogenic microflora; to provide water resistance, waterproofing, and ecological protection to slate and tile; to provide ecologically sound rubberoid and bitumen roofing felt; to provide water and moisture repellant cork material from paper, container board polyurethane foam and shavings for extending the survivability and performance, reliability of instruments and equipment; protect granular construction materials including cement, alabaster and chalk for long-term storage, particularly in high humidity regions; extend the life cycle of ferro concrete, concrete stone, brick, concrete cinder block and wooden structures and buildings exposed to weather conditions and pathogenic microflora; protect frescoes, moldings, buildings of architectural significance, gypsum structures, church and mosque domes, works of art and manuscripts from atmospheric moisture and pathogenic microflora; reduce drag for vessels such as canoes, yachts, and ships; improve the performance, reliability and corrosion resistance of cooling systems in internal combustion engines utilizing closed heat exchangers having liquid heat transfer agents; provide anti-corrosive and anti-icing coatings for undercarriages of vehicles such as tractors and combines and for agricultural machinery; reduce labor intensity and improve product quality for laminated plastic products by reducing mechanical adhesion between the surfaces of compression molds, punches, dies and product surfaces; assist the uniform distribution of dcarbosed fillers, such as wool, carbon fibers, fiberglass, artificial fibers, both in solution and suspension; encapsulate hydrophilic liquids including toxic liquids; moisture seal materials; provide "dry water" fire fighting materials; provide surfaces for facilitating pipeline transfer of granular material such as ore, coke, fertilizers or coal,; provide household matches protected from water and moisture; waterproof building foundations and structures and radioactive waste storage facilities; extend the operating service life of water cooling towers; protect railroad ties from pathogenic microflora; provide anti-icing coatings for cooling chambers, refrigerators and chillers; extend the life cycle of hydroelectric power dams; improve the efficiency of wind driven motors; improve performance characteristics of concrete and asphalt in open roadways, highways and thoroughfares; increase the life cycle of automobile tires; adsorb ions of heavy metals and radionuclides; provide anti-abrasive lubricants for ball bearings and other working parts; provide water repellant treatment for footwear; waterproof electric motors and electric insulators; waterproof pressurized suits such as diving suits; conserve paper, books, securities and documents in archives and storage facilities; provide hydrophobic black paste used for waterproof ink in pens; provide hydrophobic denim; provide hydrophobic tents, clothing, umbrellas, raincoats, and suits; provide hydrophobic funnel filters for use with gasoline and petroleum products; provide hydrophobic sails; provide hydrophobic fishing nets; waterproof fur products; render wallpaper water resistant; conserve die colors; provide skin protection from burns, acids, bases, other electrolytes, rocket fuels, highly toxic materials and flammable solutions; provide hydrophobic foam for ecological protection of the atmosphere and fona and flora against accidental spills of highly toxic poisons and rocket fuels; protect electric train current collectors from ice and corrosion; provide de-icing of airport runways; preserve vegetables and fruits under long-term storage; provide water, moisture and acid resistant footwear; provide waterproofing of printed circuit boards; provide waterproof lubricants to improve sky slip; localize vaporization of corrosive fluids in emergencies; improve longevity and performance reliability of pumps and pipelines carrying inorganic acids, alkalies and other corrosive media; encapsulate acid, base, other electrolyte and other corrosive solutions as well as hydrocarbons for transport and storage; provide hydrophobic anti-agglomeration agents; preserve instruments, equipment and devices by means of conservation lubricants; and protect radio repeater and radar antennas from corrosion and icing.

The invention will be better understood by reference to the following examples.

EXAMPLE 1

A quantity of 5.3 g expanded perlite with a bulk density of 75 kg/m$^3$ was hydroxylated by boiling in water for a period of 24 hours. After boiling, the hydroxylated perlite was fired in a vacuum for a period of 8 hours at 95° C. Pyridine in a quantity of 30.25 g was added to the mixture to bind the hydrogen chloride released upon methoxylation. The methoxylated perlite was carefully removed by extraction in hexane and acetone to eliminate all unreacted pyridine and then dried at room temperature for a period of 30 minutes followed by drying in a drying chamber for 4 hours at a temperature of 100° C.

The following were then mixed: 4 percent by weight methoxylated perlite; 1.9 percent DMDS, 1 percent acrylic lacquer; 0.1 percent sodium bicarbonate; and 93 percent hexane. The resulting dispersions was mixed for 15 minutes, and a brick was then placed in the mixture for 20 minutes. The brick was dried and placed under a water jet for 30 minutes. Three bricks were held under water for 60 minutes. One brick, which was treated was described above, one brick which was not treated, and one brick treated with a polyester lacquer coating containing 3% Aerosil. The brick which was not treated became soaked and its weight increased by 12–15%. The brick treated by the polyester lacquer became darker and its weight increased by 4%. The brick treated according to the present invention retained its original color and weight.

EXAMPLES 2-6

The procedure of Example 1 was followed using the ingredients shown in Table 2 and the resultant modifiers were used to treat wood, gypsum, rubberoid (bitumen roofing felt), tile, and slate. The surface of these materials was waterproof and remained unchanged under exposure to a water jet for 60 minutes.

TABLE 2

| COMPONENT (Percent by Weight) | EXAMPLES | | | | |
|---|---|---|---|---|---|
| | 2 | 3 | 4 | 5 | 6 |
| Solvent | acetone | hexane | dichloromethane | ethanol | gasoline |
| Adhesive | epoxy (3) | paraffin (10) | PMMA$^1$ (0.2) | acrylic (10) | vaseline (15 |
| Silicone | PMS$^2$ | PES$^3$ | DMDS$^4$ | MTS$^5$ | PMS$^2$ |

TABLE 2-continued

| COMPONENT (Percent by Weight) | EXAMPLES | | | | |
|---|---|---|---|---|---|
| | 2 | 3 | 4 | 5 | 6 |
| liquid | (10) | (5) | (0.1) | (2) | (0.2) |
| Highly dispersive hydrophobic powder | Aerosil[6] (10) | perlite (20) | talcum (2) | Aerosil (30) | talcum (40) |
| Particle size, Å | 40 | 10000 | 4000 | 80 | 2000 |
| Treated Material | wood | rubberoid | steel | tile | gypsum |
| Critical wetting angle (degrees) | 160 | 165 | 170 | 155 | 175 |

[1] = polymethylmethacrylate
[2] = polymethylsiloxane
[3] = polyethylsiloxane
[4] = dimethyldichlorosilane
[5] = methyltrichlorosilane
[6] = fumed silica commercially available from Degussa Corporation

EXAMPLES 7-15

Metal surfaces were pretreated with a porous polymer coating based on silicone, imide, acrylic, vinyl, epoxy, phenol resin, iron oxide or red lead in drying oil and the pretreated surface was dried. The pretreatment was used to assure adhesion of the solid surface modifier to the metal surface. The modifiers described in Examples 1-6 were then applied to the pretreated surfaces by means of a paint sprayer. The following tests demonstrated that the resulting coating had excellent water repellent properties and significantly reduced drag when the coated metal surface flowed through a fluid.

A. An identical momentum was imparted to two floating bodies of identical configuration with a submerged surface area of 2000 mm² under laboratory test-stand conditions. The untreated body traveled 1 m in 3.2 sec. while the body treated in accordance with Example 5 traveled 1.45 m in the same period.

B. Two 30×30 mm steel plates, one of which was treated by the recipe in Example 5, was submerged in a 2% aqueous solution of sulfuric acid. The entire surface of an untreated specimen was covered by a corrosion layer after 3.5 hours, while the treated specimen remained unaffected by the corrosive solution for a period of 1 month (720 hours).

C. Four aluminum alloy tubes 20 mm in diameter and 0.5 m in length (structural elements in rod antennas) were placed in a climate chamber. One tube was treated by the composition described in Example 1, the second was treated by the composition described in Example 4, the third was treated by the composition described in Example 5, and the fourth was untreated. The tubes were run through cyclic temperature variations from +3° through −10° C. at a relative air humidity of 115-120% for a period of 3 hours. An external inspection of the tubes was conducted after the tests. The entire surface of the unprotected tube was covered by a 1 mm thick ice layer. No visible traces of ice (or moisture) were observed on any of the three protected tubes.

D. Tests to determine the corrosion resisting of the protected metals were conducted in a climate chamber. The tests involved exposing the samples to elevated relative humidity and temperature levels. Six planar 50×10 mm steel samples 2 mm thick were used in the tests. The modifier described in Example 5 in a thickness of 100 μm was applied to three samples, while a film-forming coating based on an acrylic lacquer of the same thickness was applied to three control samples. The samples were placed in the climate chamber and were exposed to cyclic temperature variations at a relative humidity of 92%. Each test cycle included sequential exposure of the samples to a temperature of 3° C. for 30 minutes, 25° C. for 1 hour, and 50° C. for 1 hour. A total of 180 test cycles were run.

Corrosive damage to the samples were recorded. The results are shown in Table 3.

As we see from Table 3, application of the proposed composition to metals strongly reduces corrosion process.

TABLE 3

| Sample | Steel corrosion (%) as a function of the number of temperature cycles | | | | | |
|---|---|---|---|---|---|---|
| | 10 | 20 | 50 | 100 | 150 | 180 |
| Acrylic coated steel | 0 | 8 | 30 | 90 | 100 | 100 |
| " | 1 | 10 | 30 | 95 | 100 | 100 |
| " | 1 | 8 | 25 | 90 | 100 | 100 |
| Steel coated with modifier of Examples | 0 | 0 | 0 | 0 | 2 | 5 |
| | 0 | 0 | 0 | 0 | 0 | 0 |
| | 0 | 0 | 0 | 1 | 3 | 8 |

E. To incorporate water and moisture repellent properties in domestic matches, the matches were treated in accordance with a recipe consisting of (percent by weight) 89.0 percent organic solvent containing 12% butyl acetate, 26% acetone, and 62% toluene; 5.0 methoxylated magnesium hydrosilicate; 0.5% DMDS and 5.5% silicone lacquer by immersion in the mixture, holding for 10 minutes, and room temperature drying for 1 hour. The matches treated in this manner were then submerged in water for 2 hours, after which the matches were all struck successfully. At the same time, an untreated match could not be successfully struck even after only 10-15 seconds in water.

EXAMPLES 16-17

A composition consisting of 13-15 percent by weight vaseline or liquid paraffin, 5-10 percent purified turpentine, 2-15 percent methoxylated Aerosil or methoxylated magnesium hydrosilicate, and 60-79 percent ethyl alcohol was applied to the hands as a viscous fluid. Upon dipping into concentrated hydrochloric, sulfuric, nitric or phosphoric acid or caustic potassium or sodium hydroxide the fingers revealed no chemical burns.

Thus, the solid surface modifier can also be applied to human skin to protect skin from chemical burns by acids or alkalies. The modifier can also protect human skin from other electrolytes, rocket fuel and highly toxic poisons, as well as hot water-brine solutions and water.

EXAMPLE 18

A composition consisting of 2.0 percent by weight methoxylated magnesium silicate or methoxylated Aerosil powder, 1.0 percent aluminum oxide, in methyl alcohol was used to treat cotton, wool, denim or felt, mixing in solution for a period of 20 minutes, wringing, and drying for 30 minutes, followed by pressing with a hot iron at 120°–150° C. The fabrics treated in this manner had excellent long-term water-repellent and water resistant properties. When such fabrics were exposed to concentrated acids, electrolytes, and alkalies, no damage was observed.

The solid surface modifiers of the present invention can be applied to paper or paperboard to create a water-resistant cork material which can be used to improve the longevity and reliability of instruments and equipment and to protect powdered construction materials such as cement, alabaster and chalk in transport and storage, particularly in high humidity regions. They can also be used to protect books, securities and documents in archives and storage facilities. The modifier can be applied to the paper by a pain sprayer by using a brush or dipping. The treated paper can be dried and the process repeated as necessary. In order to assure uniform application of the modifier to the material surface, to increase the density of the hydrophobic center, and to reduce their free energy, the paper, after drying, can be run between high-speed calendar rolls.

For example, packets of cement-impregnated kraft-paper waterproofed by means of the solid surface modifier of the present invention can be submerged in water, and after 30 minutes no water will penetrate the waterproofed packet and it will remain dry, while in packets not treated in accordance with the present invention the cement will become saturated with water and hence become unusable.

EXAMPLE 19

Microscopic fungi resistance tests were conducted on canvas specimens and packaged kraft paper. The paper and fabric specimens were impregnated by immersion in the solid surface modifier of the present invention followed by drying until a constant weight was reached. The level of impregnation of the samples was: for fabric—4.5 to 4.8%; for paper—3.9 to 4.1%. The samples were tested for resistance to microscopic fungi. The tests involved exposing samples containing microscopic fungi under optimal conditions for development followed by an assessment of the fungal resistance of the samples and evidence of rotting.

The fungal resistance was estimated by degree of fungal growth in the samples, using a single point scale (from 0–5) for this purpose. The maximum point figure obtained for at least three samples was used at the test result. If fungal growth exceeded three points the sample was assumed to have no fungal resistance. The fungal resistance tests ran for 34 days. The results are shown in Table 4.

TABLE 4

Results From Fungal Resistance Tests

| Specimen | Fungal Resistance, points |
|---|---|
| Initial fabric | 5 |
| Impregnated fabric | 3 |
| Initial paper | 5 |
| Impregnated paper | 2 |

It is clear from Table 4 that the fabric and paper samples impregnated by the solid surface modifier of the present invention are fungal resistant.

Having thus described various embodiments of the present invention, it will be understood by those skilled in the art that the within disclosures are exemplary only and that the present invention is limited only by the following claims.

What is claimed is:

1. A solid surface modifier which comprises:
   a highly dispersed hydrophobic powder prepared by treating a finely divided material selected from the group consisting of silicas, perlite, talcum, hydrolyzed graphite, metal oxides, and mica-muscovite with an alkali or alkaline salt to preliminarily activate said finely divided material, and treating the activated finely divided material with an organic silylating agent;
   a liquid silicon compound; and
   a solvent.
2. The modifier of claim 1 which additionally comprises an adhesive.

3. The modifier of claim 1 wherein said highly disperse hydrophobic powder comprises a member selected from the group consisting of silylated perlite, silylated talcum, silylated silica, silylated metal oxides, silylated mica-muscovite, and silylated magnesium hydrosilicate.

4. The modifier of claim 1 wherein said liquid silicon compound comprises a member selected from the group consisting of alkylhalosilanes, alkylalkoxysilanes, organoaminosilanes, polyorganosiloxanes, polyalkylhydrosiloxanes, polyorganosilazanes, and organosilanolates.

5. The modifier of claim 1 wherein said solvent comprises a volatile organic solvent.

6. The modifier of claim 1 wherein said volatile organic solvent comprises a member selected from the group consisting of acetone, hexane, dichloroethane, ethanol, and gasoline.

7. The modifier of claim 6 which additionally comprises a member selected from the group consisting of sodium bicarbonate, aluminum acetate, and acetic acid.

8. The modifier of claim 2 wherein said adhesive comprises a member selected from the group consisting of epoxy resins, acrylic resins, polyamides, silicones, vaseline, and paraffin.

9. The modifier of claim 1 wherein said highly dispersed hydrophobic powder has dimensions ranging from about 40 Å to about 10 µm.

10. The solid surface modifier of claim 1 which comprises in percent by weight:

| highly-dispersed hydrophobic powder | 2–40 |
|---|---|
| liquid silicon compound | 0.1–10 |
| solvent | 50–97.9. |

11. The modifier of claim 10 which additionally comprises 0.1–2 percent of a member selected from the group consisting of sodium bicarbonate, aluminum acetate, and acetic acid.

12. The solid surface modifier of claim 2 which comprises in percent by weight:

| highly-dispersed hydrophobic powder | 2–40 |
|---|---|
| liquid silicon compound | 0.1–10 |
| adhesive | 0–15 |
| solvent | 35–97.9. |

13. The modifier of claim 12 which additionally comprises 0.1–2 percent of a member selected from the group consisting of sodium bicarbonate, aluminum acetate, and acetic acid.

14. The solid surface modifier of claim 1 wherein said alkali or alkaline salt is present in an amount equal to about 15–25 wt % of said finely divided material.

15. The solid surface modifier of claim 1 wherein said organic silylating agent is present in an amount equal to about 14–40 wt % of said activated finely divided material.

16. The solid surface modifier of claim 1 wherein said organic silylating agent is dimethyldichlorosilane.

17. A process for imparting water repellent, anti-fouling, anti-icing, anti-corrosive, and anti-friction properties to a surface which comprises applying to a substrate a dispersion of the solid surface modifier of claim 1,
   thereby providing a non-continuous layer upon said substrate, said layer comprising a collection of solid particles of said highly dispersed hydrophobic powder, said solid particles being mechanically adhered to the surface of said substrate.

* * * * *